(12) United States Patent
Shiomi et al.

(10) Patent No.: US 8,594,905 B2
(45) Date of Patent: Nov. 26, 2013

(54) CONTROL SYSTEM FOR INTERNAL COMBUSTION ENGINE

(75) Inventors: Daisuke Shiomi, Wako (JP); Hiroshi Yatani, Wako (JP); Takaaki Fukusako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 924 days.

(21) Appl. No.: 12/725,653

(22) Filed: Mar. 17, 2010

(65) Prior Publication Data

US 2010/0236521 A1 Sep. 23, 2010

(30) Foreign Application Priority Data

Mar. 18, 2009 (JP) .................................. 2009-65388

(51) Int. Cl.
*F02P 5/00* (2006.01)
*F02D 17/00* (2006.01)
*F02D 41/26* (2006.01)

(52) U.S. Cl.
USPC ...... 701/103; 701/110; 123/399; 123/406.23; 123/198 F; 123/481

(58) Field of Classification Search
USPC ....... 701/103, 110; 123/399, 436, 198 F, 481, 123/406.23
See application file for complete search history.

(56) References Cited

U.S. PATENT DOCUMENTS

| 2011/0098905 A1* | 4/2011 | Ueda et al. ................... 701/102 |
| 2012/0053822 A1* | 3/2012 | Kosaka et al. ................ 701/108 |

FOREIGN PATENT DOCUMENTS

JP 2929895 5/1999

* cited by examiner

*Primary Examiner* — Hai Huynh
(74) *Attorney, Agent, or Firm* — Squire Sanders (US) LLP

(57) ABSTRACT

A control system for an internal combustion engine is provided. In the control system, a target intake air amount is calculated according to a target output torque of the engine, and an intake air amount of the engine is controlled according to the target intake air amount. An ignition timing of the engine is controlled. The following steps 1) to 3) are repeatedly executed until a convergence time at which a difference between an estimated output torque and the target output torque becomes equal to or less than a predetermined threshold value, after setting an initial value of a temporary target intake air amount, and the target intake air amount is set to the temporary target intake air amount at the convergence time: 1) calculating an estimated retard correction amount which is a retard correction amount of the ignition timing when supplying the temporary target intake air amount of air to the engine; 2) calculating the estimated output torque of the engine according to the temporary target intake air amount and the estimated retard correction amount; and 3) modifying the temporary target intake air amount so that the estimated output torque approaches the target output torque.

12 Claims, 12 Drawing Sheets

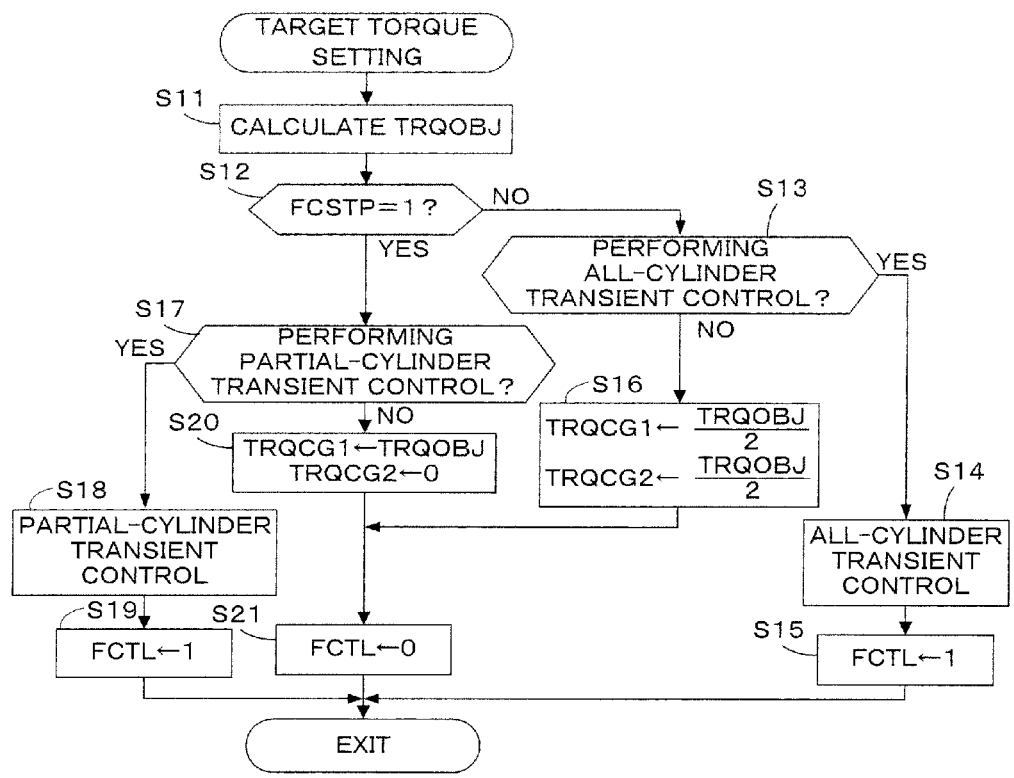
FIG. 2
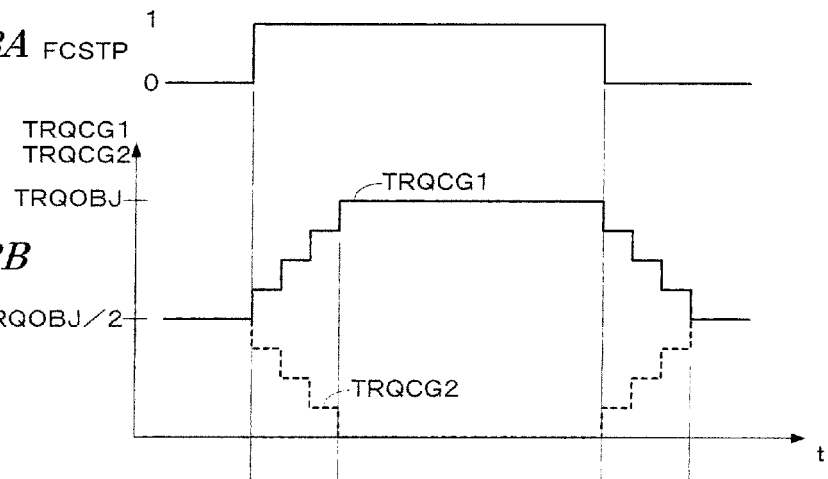
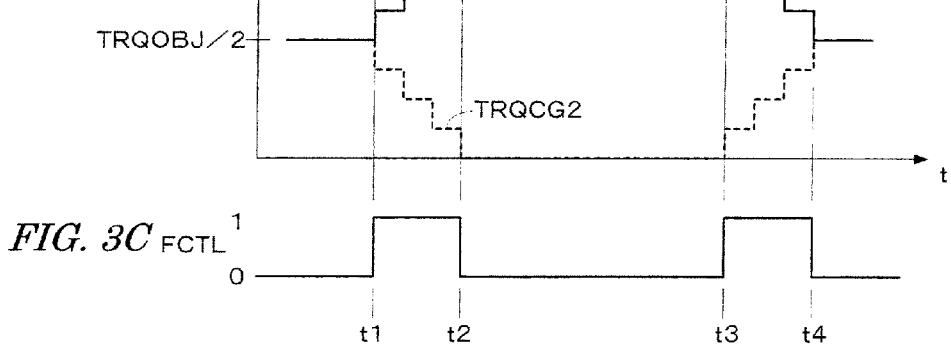
FIG. 3A FCSTP
FIG. 3B
FIG. 3C FCTL

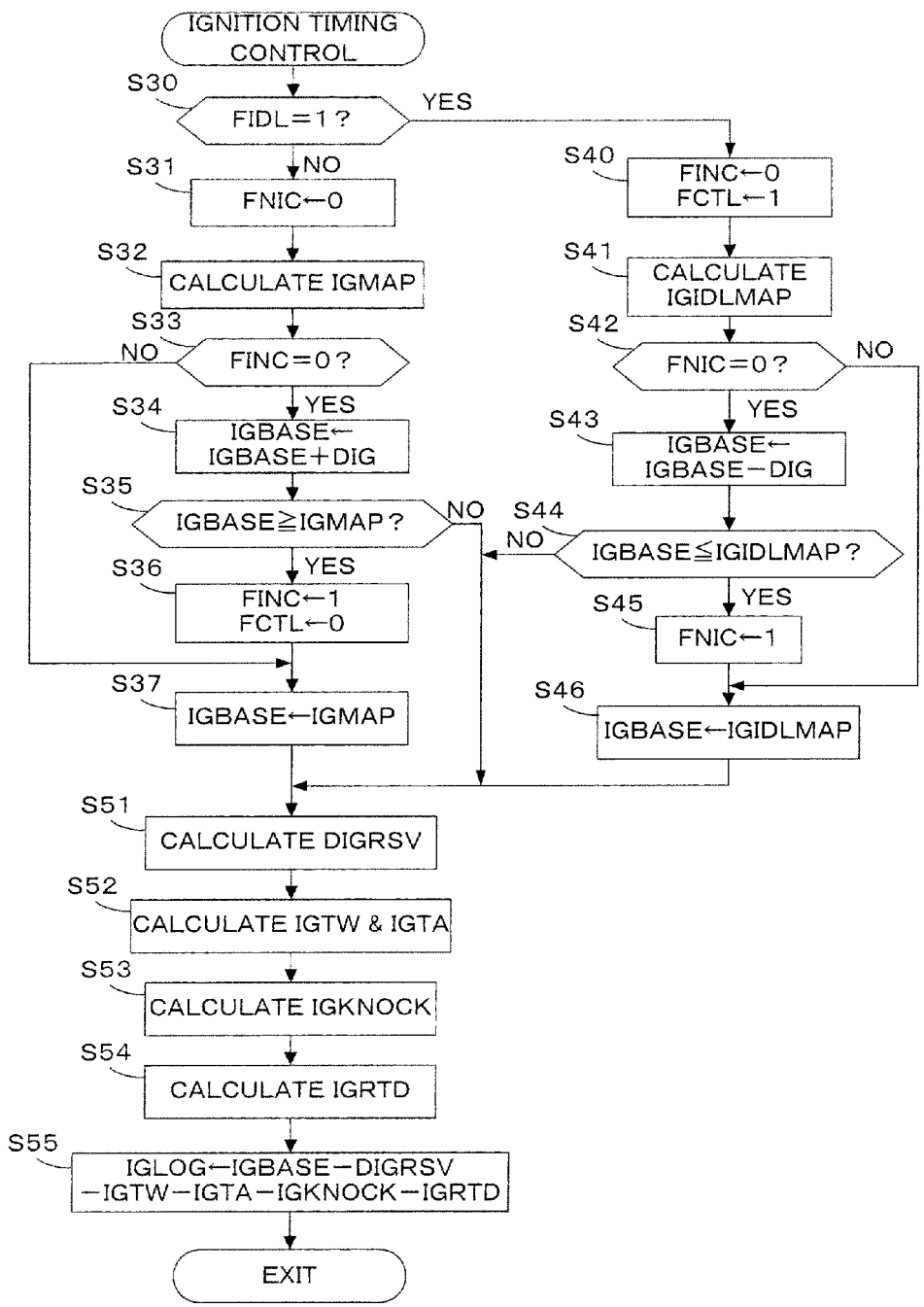

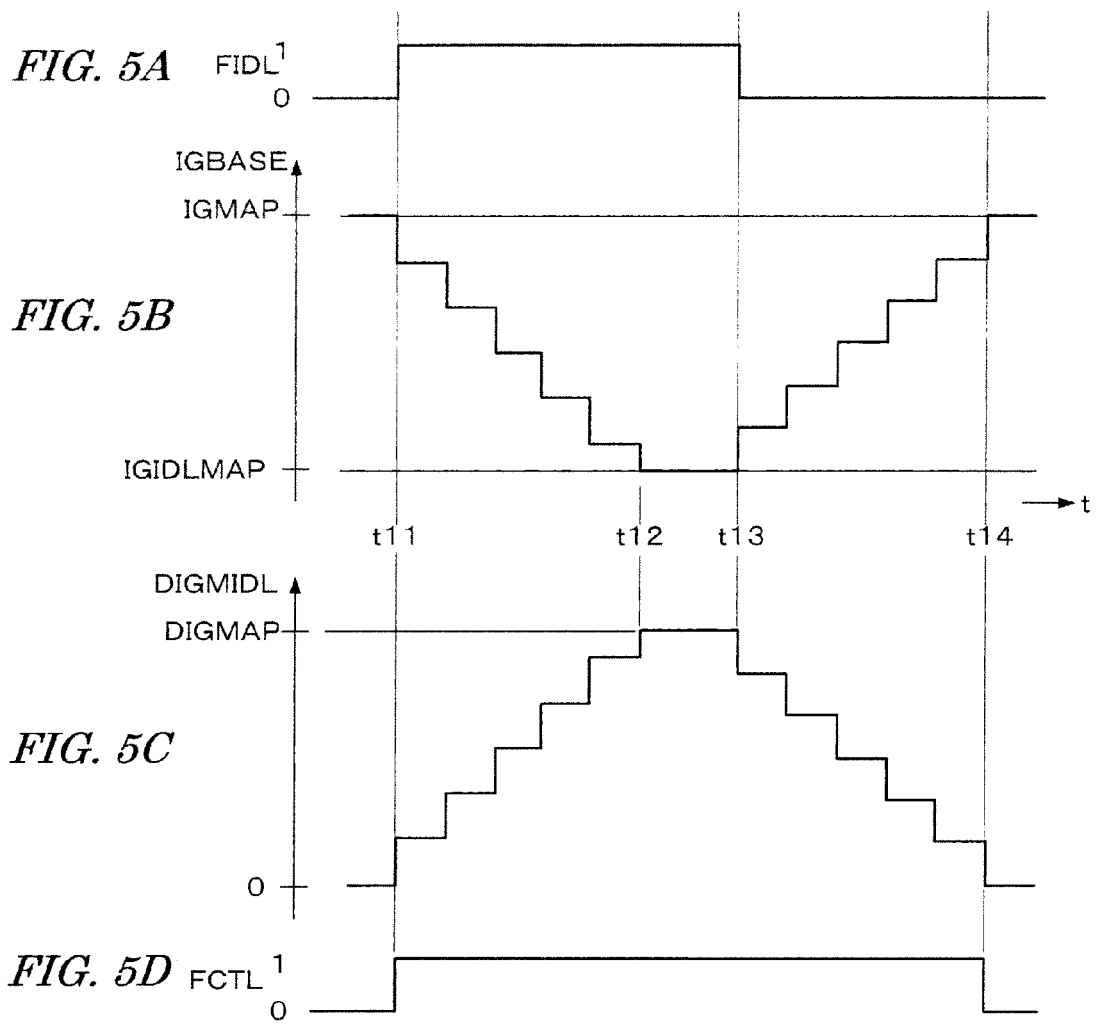

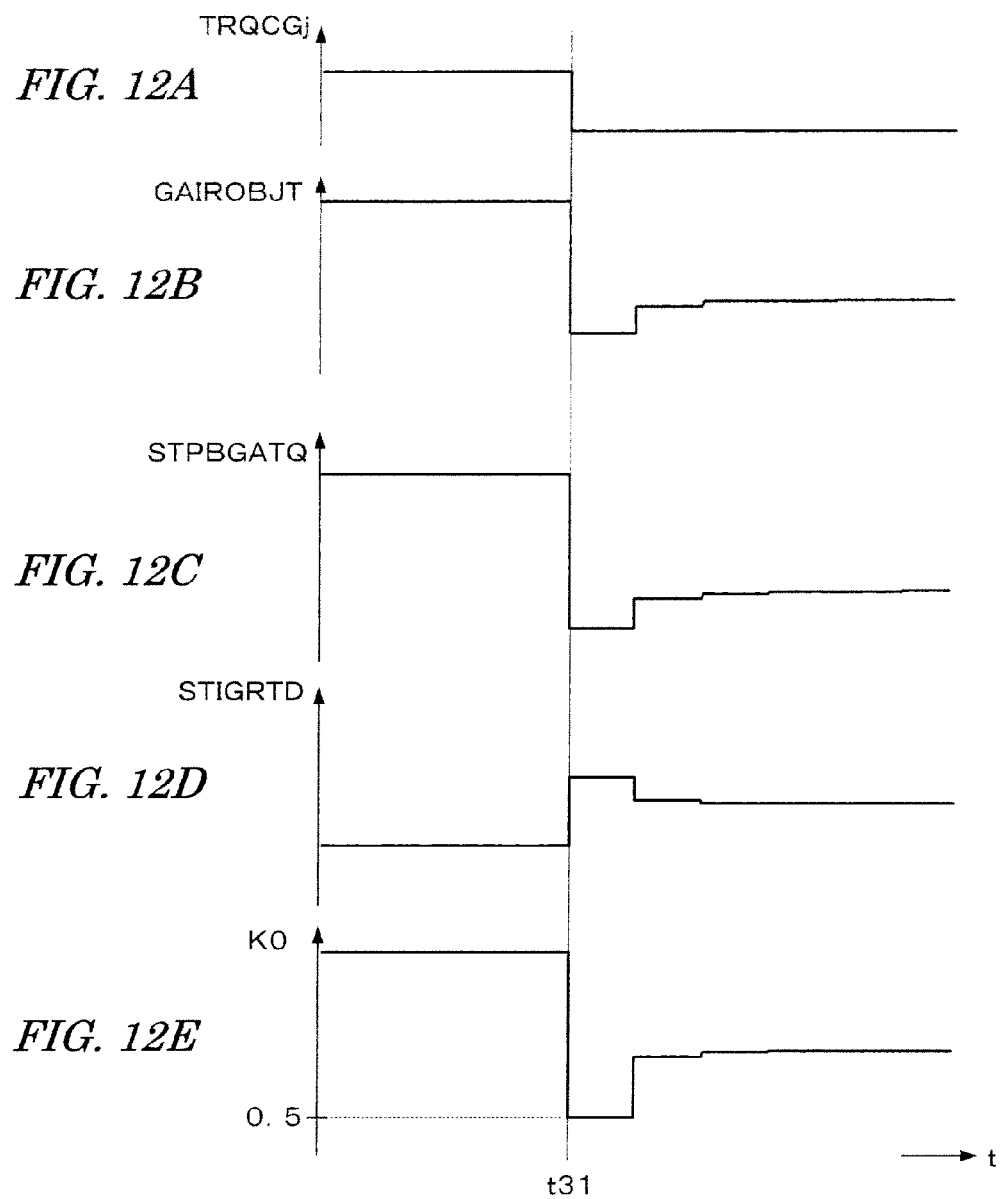

CONTROL SYSTEM FOR INTERNAL COMBUSTION ENGINE

BACKGROUND OF THE INVENTION

1. Field of the Invention

The present invention relates to a control system for an internal combustion engine, and particularly to a control system which calculates a target intake air amount of the engine, and performs an intake air amount control according to the target intake air amount and an ignition timing control.

2. Description of the Related Art

Japanese Patent Publication No. 2929895 (JP-'895) discloses an idling rotational speed control apparatus for an internal combustion engine. According to this control apparatus, a correction air amount for correcting the intake air amount is calculated so that an idling rotational speed coincides with a target rotational speed, and the correction air amount is controlled to be increased as the retard correction amount of the ignition timing increases. This control is performed since the engine output torque decreases as the retard correction amount of the ignition timing increases. The control response performance of the idling rotational speed is secured by increasing the intake air amount when the retard correction of the ignition timing is performed.

In relation to the retard correction of the ignition timing, it is necessary to take the following points into consideration when calculating the target intake air amount according to the target output torque of the engine and performing the intake air amount control so that the actual intake air amount coincides with the target intake air amount. When the engine temperature or the intake air temperature is high, or when the knocking may easily occur, the ignition timing is corrected in the retard direction. Accordingly, it is necessary not only in the idling condition as shown in JP-'895 but also in the normal operating condition other than the idling condition, to set the target intake air amount in consideration of the ignition timing setting when the engine output torque is controlled to the target torque. However, if the intake air amount changes, the intake pressure will change and the retard correction amount of the ignition timing will also change. Further, when the retard correction amount changes, the engine output torque changes. Accordingly, it is necessary to change the target intake air amount. Therefore, according to the simple control as shown in JP-'895, the engine output torque cannot be controlled to appropriately follow the target output torque when the target output torque changes.

SUMMARY OF THE INVENTION

The present invention was made contemplating the above-described point, and an object of the invention is to provide a control system for an internal combustion engine, which performs an intake air amount control in consideration of the ignition timing control, and improves a control response performance of the control for making the engine output torque coincide with the target output torque.

To attain the above object, the present invention provides a control system for an internal combustion engine, including target intake air amount calculating means, intake air amount control means, and ignition timing control means. The target intake air amount calculating means calculates a target intake air amount (GAIROBJ) according to a target output torque (TRQOBJ, TRQCGj) of the engine. The intake air amount control means controls an intake air amount of the engine according to the target intake air amount (GAIROBJ). The ignition timing control means controls an ignition timing (IGLOG) of the engine. The target intake air amount calculating means repeatedly executes the following steps 1) to 3) until a convergence time at which a difference between an estimated output torque (TRQTMP) and the target output torque (TRQOBJ, TRQCGj) becomes equal to or less than a predetermined threshold value (DTRQTH), after setting an initial value of a temporary target intake air amount (GAIROBJMID), and sets the target intake air amount (GAIROBJ) to the temporary target intake air amount (GAIROBJMID) at the convergence time: 1) calculating an estimated retard correction amount (STIGRTD) which is a retard correction amount of the ignition timing (IGLOG) when supplying the temporary target intake air amount (GAIROBJMID) of air to the engine; 2) calculating the estimated output torque (TRQTMP) of the engine according to the temporary target intake air amount (GAIROBJMID) and the estimated retard correction amount (STIGRTD); and 3) modifying the temporary target intake air amount (GAIROBJMID) so that the estimated output torque (TRQTMP) approaches the target output torque (TRQOBJ, TRQCGj).

With this configuration, after setting the initial value of the temporary target intake air amount, the first step 1) of calculating the estimated retard correction amount of the ignition timing when supplying the temporary target intake air amount to the engine, the second step 2) of calculating the estimated output torque according to the temporary target intake air amount and the estimated retard correction amount, and the third step 2) of modifying the temporary target intake air amount so that the estimated output torque approaches the target output torque, are repeatedly executed. Further, the target intake air amount is set to the temporary target intake air amount at the convergence time at which the difference between the estimated output torque and the target output torque becomes equal to or less than the predetermined threshold value. Thus, by repeatedly executing the first to third steps, the intake air amount control according to the setting of the retard correction amount of the ignition timing is performed, and the control response performance of the control for making the engine output torque coincide with the target output torque, is improved.

The present invention further provides a control system for an internal combustion engine, including target intake air amount calculating means, intake air amount control means, and ignition timing control means. The target intake air amount calculating means calculates a target intake air amount (GAIROBJ) according to a target output torque (TRQOBJ, TRQCGj) of the engine. The intake air amount control means controls an intake air amount of the engine according to the target intake air amount (GAIROBJ). The ignition timing control means controls an ignition timing (IGLOG) of the engine. The target intake air amount calculating means repeatedly executes the following steps 1) to 4) until a convergence time at which a difference (DK) between a temporary torque reduction coefficient (K0) and an estimated torque reduction coefficient (KIG) indicative of a reduction rate of the output torque of the engine becomes equal to or less than a predetermined threshold value (DKTH), after setting an initial value of the temporary torque reduction coefficient (K0), and sets the target intake air amount (GAIROBJ) to a temporary target intake air amount (GAIROBJT) at the convergence time: 1) calculating the temporary target intake air amount (GAIROBJT) according to the temporary torque reduction coefficient (K0) and the target output torque (TRQOBJ, TRQCGj); 2) calculating an estimated retard correction amount (STIGRTD) which is a retard correction amount of the ignition timing (IGLOG) when supplying the temporary target intake air amount (GAIROBJT) of air to the engine; 3) calculating the estimated torque reduction coefficient (KIG) according to the estimated retard correction amount (STIGRTD); and 4) modifying the temporary torque reduction coefficient (K0) so that the temporary torque reduction coefficient (K0) approaches the estimated torque reduction coefficient (KIG).

With this configuration, after setting an initial value of the temporary torque reduction coefficient, the first step 1) of calculating the temporary target intake air amount according to the temporary torque reduction coefficient and the target output torque, the second step 2) of calculating the estimated retard correction amount of the ignition timing when supplying the temporary target intake air amount to the engine, the third step 3) of calculating the estimated torque reduction coefficient indicative of the reduction rate of the output torque of the engine according to the estimated retard correction amount, and the fourth step 4) of modifying the temporary torque reduction coefficient so that the temporary torque reduction coefficient approaches the estimated torque reduction coefficient, are repeatedly executed. Further, the target intake air amount is set to the temporary target intake air amount at the convergence time at which the difference between the temporary torque reduction coefficient and the estimated torque reduction coefficient becomes equal to or less than the predetermined threshold value. Thus, by repeatedly executing the first to fourth steps, the intake air amount control according to the setting of the retard correction amount of the ignition timing is performed, and the control response performance of the control for making the engine output torque coincide with the target output torque is improved.

Preferably, a calculation period (T2) of the target intake air amount calculating means is set so that a maximum time period (T2×IMAX) necessary for calculating the target intake air amount (GAIROBJ) is shorter than a control period (T1) of the intake air amount control means.

With this configuration, the calculation period of the target intake air amount is set so that the maximum time period for calculating the target intake air amount is shorter than the control period of the intake air amount control means. Therefore, an appropriate value of the target intake air amount can be certainly reflected in the intake air amount control.

Preferably, the engine has a plurality of cylinders which consist of a first cylinder group and a second cylinder group, and the control system includes operating cylinder switching means for switching between an all-cylinder operation in which both of the first and second cylinder groups are operated and a partial-cylinder operation in which one of the first and second cylinder groups is operated. The target intake air amount calculating means calculates the target intake air amount (GAIROBJ) upon the switching between the all-cylinder operation and the partial-cylinder operation.

With this configuration, the target intake air amount is calculated upon the switching between the all-cylinder operation and the partial-cylinder operation. Therefore, the target intake air amount is appropriately set when switching the number of operating cylinders, to suppress a change in the engine rotational speed due to the switching.

BRIEF DESCRIPTION OF THE DRAWINGS

FIG. 2 is a flowchart of a process for setting target torques (TRQCG1, TRQCG2);

FIGS. 3A-3C are time charts for illustrating the process of FIG. 2;

FIG. 4 is a flowchart of an ignition timing control;

FIGS. 5A-5D are time charts for illustrating the process of FIG. 4;

FIGS. 12A-12E are time charts for illustrating the process of FIG. 10;

DETAILED DESCRIPTION OF THE PREFERRED EMBODIMENTS

Preferred embodiments of the present invention will now be described with reference to the drawings.

Figure 1:
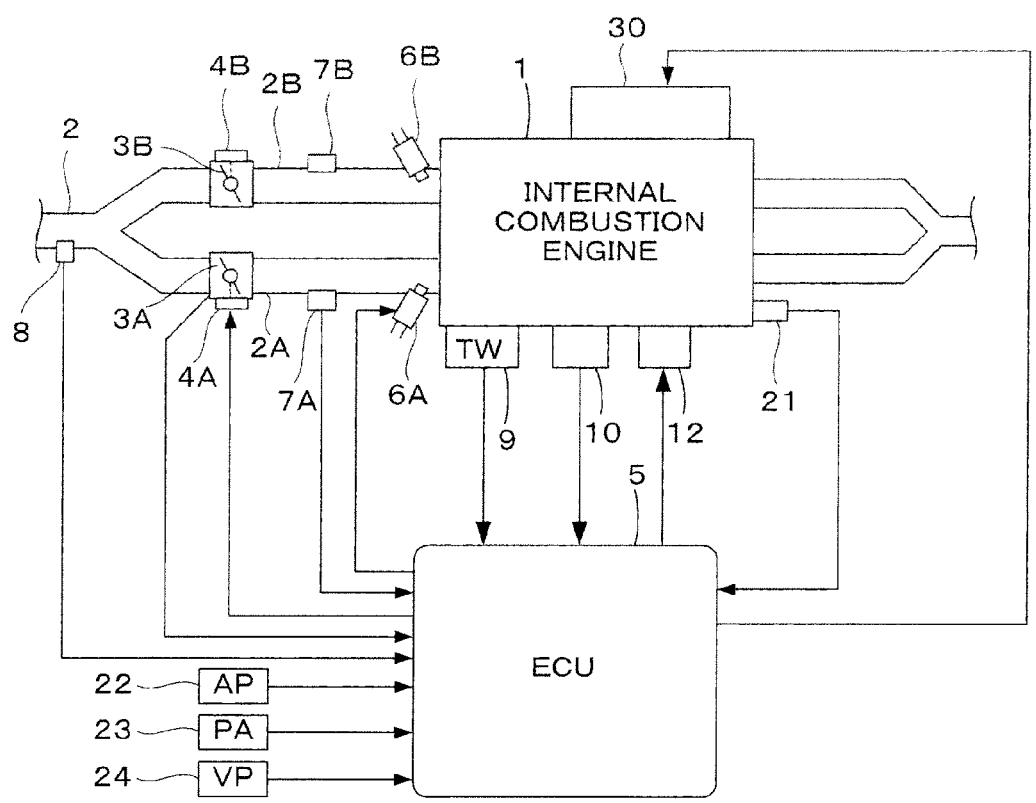
FIG. 1 shows a configuration of an internal combustion engine and a control system therefor according to one embodiment of the present invention.

FIG. 1 is a schematic diagram showing a configuration of an internal combustion engine and a control system therefor according to one embodiment of the present invention. A V-type 10-cylinder internal combustion engine (hereinafter referred to as "engine") 1 is provided with a first bank having #1 to #5 cylinders (first cylinder group) and a second bank having #6 to #10 cylinder (second cylinder group). The second bank is provided with a cylinder halting mechanism 30 for temporarily halting operation of #6 to #10 cylinders.

The intake pipe 2 of the engine 1 branches out to a first branch intake pipe 2A and a second branch intake pipe 2B. The first branch intake pipe 2A supplies air to cylinders of the first bank, and the second branch intake pipe 2B supplies air to cylinders of the second bank. The first branch intake pipe 2A is provided with a throttle valve 3A. A throttle valve opening sensor (not shown) for detecting an opening TH of the throttle valve 3A is provided, and the detection signal of the throttle valve opening sensor is supplied to an electronic control unit (hereinafter referred to as "ECU") 5. The throttle valve 3A is configured to be actuated to open and close by an actuator 4A, and the operation of the actuator 4A is controlled by the ECU 5.

Fuel injection valves 6A are provided slightly upstream of respective intake valves (not shown). Each fuel injection valve 6A is connected to a fuel pump (not shown), and electrically connected to the ECU 5. A valve opening period of each fuel injection valve 6A is controlled by a signal output from the ECU 5.

An intake pressure sensor 7A is provided immediately downstream of the throttle valve 3A. The intake pressure sensor 7A detects an intake pressure PBA and the detection signal is supplied to the ECU 5.

The second branch intake pipe 2B is provided, similarly to the first branch intake pipe 2A, with a throttle valve 3B, an actuator 4B, fuel injection valves 6B, and an intake pressure sensor 7B which are connected to the ECU 5 (connection lines are not shown). Therefore, one of the detected values of the intake pressure PBA is obtained by the intake pressure sensor 7A and the other is obtained by the intake pressure sensor 7B. In the control described below, the detected value by the intake pressure sensor corresponding to the bank including the controlled object cylinders is applied as the intake pressure PBA.

An intake air temperature sensor 8 for detecting an intake air temperature TA is disposed upstream of the branch-out point of the intake pipe 2, and the detection signal of the intake air temperature sensor 8 is supplied to the ECU 5.

A coolant temperature sensor 9 for detecting an engine coolant temperature TW and a knock sensor 21 for detecting a knocking are mounted on the body of the engine 1. The detection signals of these sensors are supplied to the ECU 5.

A crank angle position sensor 10 for detecting a rotational angle of the crankshaft (not shown) of the engine 1 is connected to the ECU 5, and a signal corresponding to a detected rotational angle of the crankshaft is supplied to the ECU 5. The crank angle position sensor 10 includes a cylinder discrimination sensor which outputs a pulse (hereinafter referred to as "CYL pulse") at a predetermined crank angle position for a specific cylinder of the engine 1. The crank angle position sensor 10 also includes a top dead center (TDC) sensor which outputs a TDC pulse at a crank angle position before a TDC of a predetermined crank angle starts at an intake stroke in each cylinder and a CRK sensor for generating a CRK pulse with a constant crank angle period (e.g., a period of 6 degrees, shorter than the period of generation of the TDC pulse). The CYL, TDC, and CRK pulses are supplied to the ECU 5. The CYL, TDC, and CRK signal pulses are used to control various timings, such as the fuel injection timing and the ignition timing, and to detect an engine rotational speeds NE.

The cylinder deactivation mechanism 30 has a plurality of electromagnetic valve, and the operation of the electromagnetic valves is controlled by the ECU 5. By opening and closing the electromagnetic valves, a switching control which switches an all-cylinder operation and a partial-cylinder operation. In the all-cylinder operation, all cylinders are operated, on the other hand, in the partial-cylinder operation, the #1 to #5 cylinders are operated and the #6 to #10 cylinders are deactivated.

An ignition plug 12 provided in each cylinder of the engine 1 is connected to the ECU 5, and a drive signal, i.e., an ignition signal of the spark plug 12 is supplied from the ECU 5.

An accelerator sensor 22, an atmospheric pressure sensor 23, and a vehicle speed sensor 24 are connected to the ECU 5. The accelerator sensor 22 detects an operation amount AP of the accelerator pedal of the vehicle driven by the engine 1 (hereinafter the operation amount will be referred to as "accelerator operation amount"). The atmospheric pressure sensor 23 detects an atmospheric pressure PA. The vehicle speed sensor 24 detects a running speed (vehicle speed) VP of the vehicle driven by the engine 1. The detection signals of these sensors are supplied to the ECU 5.

The ECU 5 includes an input circuit having various functions including a function of shaping the waveform of input signals from the various sensors, a function of correcting the voltage levels of the signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the fuel injection valves 6A and 6B, the ignition plug 12, the electromagnetic valves of the cylinder halting mechanism 30, and the like.

The ECU 5 controls the throttle valves 3A and 3B, the valve opening period of the fuel injection valves 6A and 6B, and the ignition timing, based on the detection signals of various sensors. The ECU 5 further performs a switching control between the all-cylinder operation and the partial-cylinder operation of the engine 1.

In this embodiment, a target output torque TRQOBJ of the engine 1 is calculated according to the detected parameters such as the accelerator operation amount AP; a target intake air amount GAIROBJ is calculated according to the target output torque TRQOBJ; and a target throttle valve opening THOBJ is calculated according to the target intake air amount GAIROBJ. The throttle valves 3A and 3B are actuated so that the detected throttle valve opening TH coincides with the target throttle valve opening THOBJ.

FIG. 2 is a flowchart of a process for calculating the target output torque TRQOBJ and setting a first bank target torque TRQCG1 and a second bank target torque TRQCG2 according to the target output torque TRQOBJ. This process is executed at a first predetermined time intervals T1 (e.g., 10 msec) by the CPU in the ECU 5.

In step S11, the target output torque TRQOBJ is calculated according to an engine operating condition. The target output torque TRQOBJ is set so as to be substantially proportional to the accelerator operation amount AP in a normal operating condition (operating conditions other than an idling condition). On the other hand, in the idling condition, the target output torque TRQOBJ is set so that the engine rotational speed NE is maintained at a target rotational speed according to the operating condition of the auxiliaries (for example, an air conditioner, a power steering device, and the like) which are loads on the engine 1.

In step S12, it is determined whether or not a cylinder-halting condition satisfied flag FCSTP is equal to "1". The cylinder-halting condition satisfied flag FCSTP is set to "1" when a cylinder-halting condition for performing the partial-cylinder operation is satisfied. The cylinder-halting condition is determined by the process (not shown) according to the engine rotational speed NE, the throttle valve opening TH, the vehicle speed VP, and the like. The cylinder-halting condition satisfied flag FCSTP is set to "0" when the cylinder-halting condition is not satisfied.

If FCSTP is equal to "0", i.e., when performing the all-cylinder operation, it is determined whether or not an all-cylinder operation transient control is performed (step S13). The all-cylinder operation transient control is performed immediately after the shift from the partial-cylinder operation to the all-cylinder operation. If the all-cylinder operation transient control is performed, the process proceeds to step S14, to continue the all-cylinder operation transient control. When performing the partial-cylinder operation, only the cylinders of the first bank are operated. Accordingly, the first bank target torque TRQCG1 is set to the target output torque TRQOBJ, and the second bank target torque TRQCG2 is set to "0". Therefore, in the all-cylinder operation transient control, the first bank target torque TRQCG1 is gradually reduced from the target output torque TRQOBJ to (TRQOBJ/2), and the second bank target torque TRQCG2 is gradually increased from "0" to (TRQOBJ/2) (refer to FIG. 3, time t3 to t4).

In step S15, a convergence calculation executing flag FCTL is set to "1". When the convergence calculation executing flag FCTL is equal to "1", the convergence calculation is applied to the calculation of the target intake air amount GAIROBJ as described below.

When the all-cylinder operation transient control is completed (i.e., the first bank target torque TRQCG1 has reached (TRQOBJ/2)), the process proceeds from step S13 to step S16, in which both of the first bank target torque TRQCG1 and the second bank target torque TRQCG2 are set to (TRQOBJ/2). Subsequently, the convergence calculation executing flag FOIL is set to "0" (step S21).

If FCSTP is equal to "1" in step S12, i.e., if performing the partial-cylinder operation, it is determined whether or not a partial-cylinder operation transient control is performed (step S17). The partial-cylinder operation transient control is performed immediately after the shift from the all-cylinder operation to the partial-cylinder operation. If the answer to step S12 is affirmative (YES), the process proceeds to step S18 to continue the partial-cylinder operation transient control. That is, the first bank target torque TRQCG1 is gradually increased from (TRQOBJ/2) to the target output torque TRQOBJ, and the second bank target torque TRQCG2 is gradually reduced from (TRQOBJ/2) to "0" (refer to FIG. 3, time t1 to t2). In step S19, the convergence calculation executing flag FCTL is set to "1".

When the partial-cylinder operation transient control is completed (i.e., the first bank target torque TRQCG1 has reached TRQOBJ), the process proceeds from step S17 to step S20, in which the first bank target torque TRQCG1 is set to the target output torque TRQOBJ and the second bank target torque TRQCG2 is set to "0". Thereafter, the process proceeds to step S21.

FIG. 3 is a time chart for illustrating the process of FIG. 2. When the cylinder-halting condition satisfied flag FCSTP changes to "1" from "0" at time t1, the partial-cylinder operation transient control is performed until time t2, wherein the first bank target torque TRQCG1 gradually increases, and the second bank target torque TRQCG2 gradually decreases. In the time period from t1 to t2, the convergence calculation execution flag FCTL is set to "1". When the cylinder-halting condition satisfied flag FCSTP changes from "1" to "0" at time t3, the all-cylinder operation transient control is performed until time t4, wherein the first bank target torque TRQCG1 gradually decreases, and the second bank target torque TRQCG2 gradually increases. In the time period from t3 to t4, the convergence calculation execution flag FCTL is set to "1".

FIG. 4 is a flowchart of a process for performing an ignition timing control. The process of the ignition timing control is executed by the CPU in the ECU 5 in synchronism with generation of the TDC pulse. The ignition timing is a parameter which is defined as an advance amount of the ignition timing from the timing at which the piston is positioned at the compression top dead center.

In step S30, it is determined whether or not an idle flag FIDL is equal to "1". The idle flag FIDL is set to "1" when the engine 1 is in the idling condition.

When the engine 1 is in the normal operating condition other than the idling condition, the process proceeds from step S30 to step S31, in which an idling operation shift completion flag FNIC is set to "0". In step S32, a MBT (Minimum Spark Advance for Best Torque) map, on which the optimal ignition timings (ignition timing which makes the engine output torque the maximum) are set, is retrieved according to the engine rotational speed NE and the intake pressure PBA, to calculate an optimal ignition timing IGMAP.

In step S33, it is determined whether or not a normal operation shift completion flag FINC is equal to "0". Since the normal operation shift completion flag FINC is set to "0" in the idling condition (step S40), the answer to step S33 is affirmative (YES) immediately after the shift from the idling operation to the normal operation, and the basic ignition timing IGBASE is increased by a predetermined amount DIG with the following equation (1) (step S34).

$$IGBASE = IGBASE + DIG \quad (1)$$

In step S35, it is determined whether or not the basic ignition timing IGBASE is equal to or greater than the optimal ignition timing IGMAP. Since the answer to step S35 is initially negative (NO), the process immediately proceeds to step S51. Thereafter, step S34 is repeatedly executed. When the basic ignition timing IGBASE gradually increases to reach the optimal ignition timing IGMAP, the answer to step S35 becomes affirmative (YES). Therefore, the normal operation shift completion flag FINC is set to "1" and the convergence calculation execution flag FOIL is set to "0" (step S36). After the normal operation shift completion flag FINC is set to "1", the process directly proceeds to step S37 from step S33.

In step S37, the basic ignition timing IGBASE is set to the optimal ignition timing IGMAP.

In steps S51 to S54, a retard correction amount for correcting the basic ignition timing IGBASE is calculated. The retard correction amount takes a positive value when correcting the basic ignition timing IGBASE in the retarding direction.

In step S51, a DIGRSV map is retrieved according to the engine rotational speed NE and the intake pressure PBA, to calculate a basic retard correction amount DIGRSV. In a high load operating condition where the intake pressure PBA is high, a knock limit ignition timing (a lower limit value of the ignition timing range wherein a knocking may easily occur) IGKNK is less than the optimal ignition timing IGMAP, i.e., the knock limit ignition timing IGKNK takes a value at the retarding side with respect to the value of IGMAP. Accordingly, by applying the basic retard correction amount DIGRSV (=IGMAP−IGKNK), the knocking is prevented from occurring.

In step S52, a coolant temperature correction amount IGTW is calculated according to the engine coolant temperature TW, and an intake air temperature correction amount IGTA is calculated according to the intake air temperature TA. In step S53, a knocking correction amount IGKNOCK is calculated according to the detected result obtained in the knocking detection process (not shown). The knocking correction amount IGKNOCK is increased by a predetermined amount if the knocking is detected based on the output of the knock sensor 21. On the other hand, the knock correction amount IGKNOCK is gradually reduced during the period in which the knocking is not detected. Known methods, which are disclosed for example in Japanese Patent Laid-open No. 2004-353473, are employed as the detecting method of the knocking and the calculation method of the knock correction amount IGKNOCK.

In step S54, an additional retard correction amount IGRTD is calculated as a sum of retard correction amounts other than the above-described retard correction amount described above, such as a retard correction amount applied immediately before the fuel cut operation starts, a retard correction amount applied when returning to the normal operation from the fuel cut operation, and a retard correction amount applied for maintaining the engine rotational speed NE at the target rotational speed in the idling condition.

In step S55, the ignition timing IGLOG is calculated by the following equation (2). The ignition signal supplied to the spark plug 12 is output at a timing according to the ignition timing IGLOG.

$$IGLOG=IGBASE-DIGRSV-IGTW-IGTA-IGKNOCK-IGRTD \quad (2)$$

On the other hand, when the engine 1 is in the idling condition, the process proceeds from step S30 to step S40, in which the normal operation shift completion flag FINC is "0" and the convergence calculation execution flag FCTL is set to "1". In step S41, an idle basic ignition timing IGIDLMAP is calculated according to the engine rotational speed NE and the intake pressure PBA. The idle basic ignition timing is set to a timing which is retarded by a predetermined retarded amount from the optimal ignition timing (MBT).

In step S42, it is determined whether or not the idling operation shift completion flag FNIC is equal to "0". Immediately after the shift from the normal operation to the idling operation, the answer to step S42 is affirmative (YES). Accordingly, the basic ignition timing IGBASE is reduced by the predetermined amount DIG with the following equation (3) (step S43).

$$IGBASE=IGBASE-DIG \quad (3)$$

In step S44, it is determined whether or not the basic ignition timing IGBASE is equal to or less than the idle basic ignition timing IGIDLMAP. Since the answer to step S44 is initially negative (NO), the process immediately proceeds to step S51. If step S43 is repeatedly executed, the basic ignition timing IGBASE gradually decreases to reach the idle basic ignition timing IGIDLMAP. Then, the answer to step S44 becomes affirmative (YES), and the idling operation shift completion flag FNIC is set to "1" (step S45). After the idling operation shift completion flag FNIC is set to "1", the process immediately proceeds from step S42 to step S46.

In step S46, the basic ignition timing IGBASE is set to the idle basic ignition timing IGIDLMAP. Thereafter, the process proceeds to the step S51.

FIG. 5 is a time chart for illustrating the process of FIG. 4. When the engine operating condition shifts to the idling condition at time t11, the basic ignition timing IGBASE gradually decreases from the optimal ignition timing IGMAP, to reach the idle basic ignition timing IGIDLMAP at time t12. Thereafter, the basic ignition timing IGBASE is maintained at the idle basic ignition timing IGIDLMAP until the idling condition ends at time t13. When s the engine operating condition shifts to the normal operating condition at time t13, the basic ignition timing IGBASE gradually increases. If the basic ignition timing IGBASE reaches the optimal ignition timing IGMAP at time t14, the basic ignition timing IGBASE is thereafter maintained at the optimal ignition timing IGMAP. The convergence calculation execution flag FCTL is set to "1" from time t11 to t14.

Figure 6:
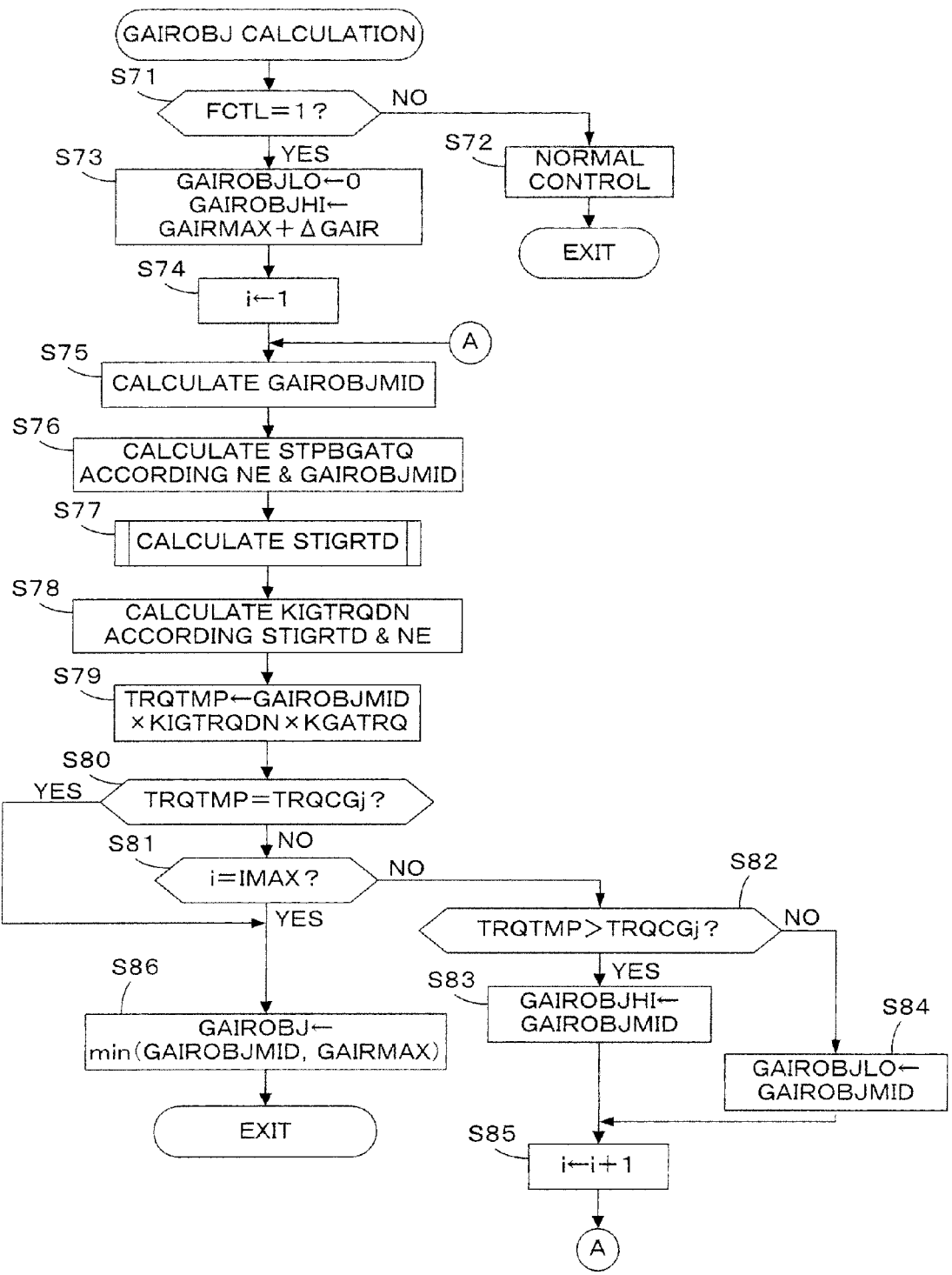
FIG. 6 is a flowchart of a process for calculating a target intake air amount (GAIROBJ)

FIG. 6 is a flowchart of a process for calculating the target intake air amount GAIROBJ according to the target torque TRQCGj of each bank (j=1 or 2). This process is executed by the CPU in the ECU 5 at a second predetermined time intervals T2 (e.g., 0.01 msec) which is shorter than the first predetermined time intervals T1.

In step S71, it is determined whether or not the convergence calculation execution flag FCTL is equal to "1". If the answer to step S71 is negative (NO), the target intake air amount GAIROBJ is calculated by the normal control (step S72). That is, the target intake air amount GAIROBJ is calculated according to the target torque TRQCGj and the engine rotational speed NE.

If FCTL is equal to "1" in step S71, the process proceeds to step S73, in which a lower target intake air amount GAIROBJLO is set to "0", and an upper target intake air amount GAIROBJHI is calculated by the following equation (4). In the equation (4), GAIRMAX is the maximum value of the intake air amount and Δ GAIR is a minimal additional value.

$$GAIROBJHI=GAIRMAX+\Delta GAIR \quad (4)$$

In step S74, an index parameter i is set to "1". In step S75, a middle target intake air amount GAIROBJMID is calculated by the following equation (5) as an average value of the lower target intake air amount GAIROBJLO and the upper target intake air amount GAIROBJHI.

$$GAIROBJMID=(GAIROBJLO+GAIROBJHI)/2 \quad (5)$$

Figure 8A:
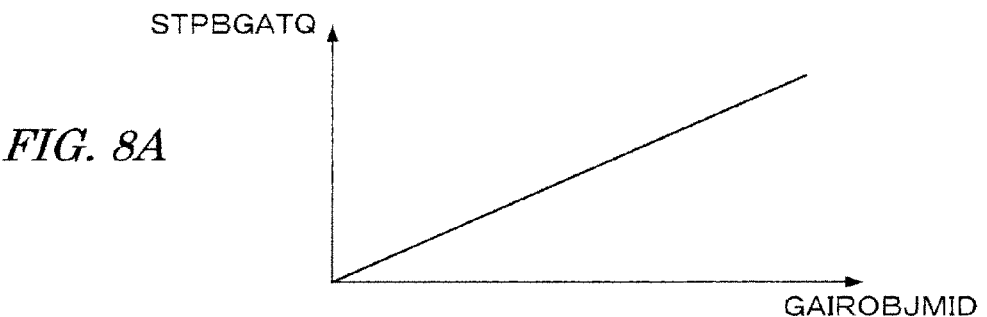
FIGS. 8A and 8B show maps referred to in the process of FIG. 6.

In step S76, a STPBGATQ map is retrieved according to the engine rotational speed NE and the middle target intake air amount GAIROBJMID, to calculate an estimated intake pressure STPBGATQ. The STPBGATQ map is set, as shown in FIG. 8A, so that the estimated intake pressure STPBGATQ is substantially proportional to the middle target intake air amount GAIROBJMID.

Figure 7:
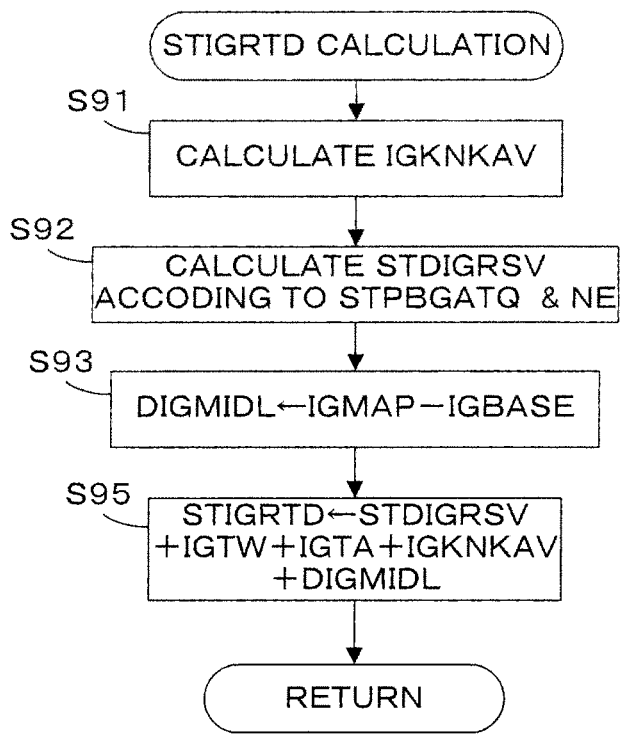
FIG. 7 is a flowchart of a process for calculating an estimated retard correction amount (STIGRTD) of the ignition timing in the process of FIG. 6.

In step S77, a STIGRTD calculation process shown in FIG. 7 is executed to calculate an estimated retard correction amount STIGRTD of the ignition timing. In step S91 of FIG. 7, a moving average value (hereinafter referred to as "averaged knock correction amount") IGKNKAV of the knock correction amount IGKNOCK calculated by the process of FIG. 4 is calculated by the following equation (6). In the equation (6), "k" is a discrete time digitized with the calculation period of the knock correction amount IGKNOCK. With respect to the present value, "k" is set to "0" and increases as the time goes back to the past. Further, NAV is a predetermined value set to, for example, "10".

$$IGKNKAV = \sum_{k=0}^{NAV-1} IGKNOCK(k)/NAV \quad (6)$$

In step S92, an estimated basic retard correction amount STDIGRSV is calculated according to the estimated intake pressure STPBGATQ and the engine rotational speed NE using the map used in step S51 of FIG. 4.

In step S93, an idle retard correction amount DIGMIDL is calculated by the following equation (7). In the idling condition and in the transient control immediately after the shift from the idling condition to the normal operating condition, the idle retard correction amount DIGMIDL takes a value greater than "0" as shown in FIG. 5(c).

$$DIGMIDL=IGMAP-IGBASE \quad (7)$$

In step S93, the coolant temperature correction amount IGTW and the intake air temperature correction amount IGTA which are calculated in the process of FIG. 4, the averaged knock correction amount IGKNKAV calculated in step S91, the estimated basic retard correction amount STDIGRSV calculated in step S92, and the idle retard correction amount DIGMIDL calculated in step S93 are applied to the following equation (8), to calculate the estimated retard correction amount STIGRTD. In this embodiment, the additional retard correction amount IGRTD is not included in the estimated retard correction amount STIGRTD.

$$STIGRTD=STDIGRSV+IGTW+IGTA+IGKNKAV+DIGMIDL \quad (8)$$

Figure 8B:
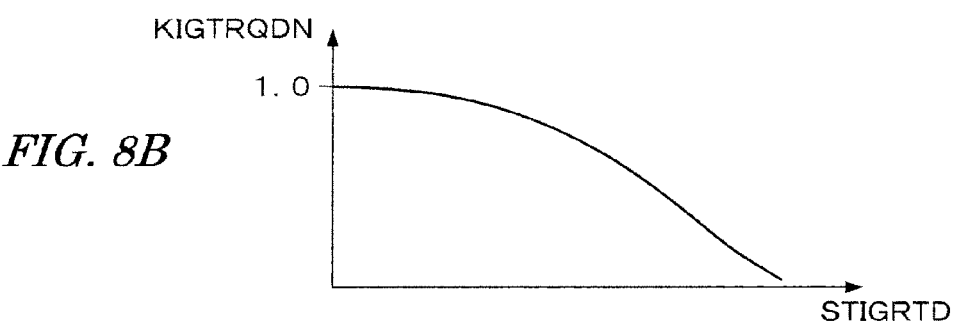
Figure 8C:
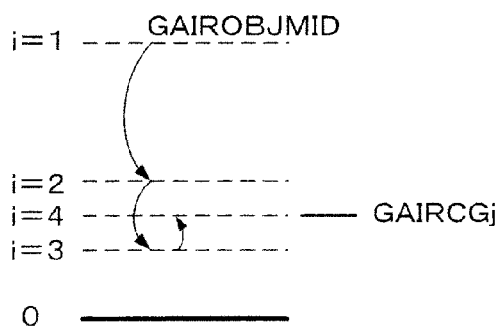
FIG. 8C is a diagram for illustrating the process of FIG. 6.

Referring back to FIG. 6, in step S78, a KIGTRQDN map is retrieved according to the estimated retard correction amount STIGRTD and the engine rotational speed NE, to calculate a torque reduction coefficient KIGTRQDN indicative of a reduction ratio of the engine output torque caused by the retard correction of the ignition timing. The KIGTRQDN map is set so that the torque reduction coefficient KIGTRQDN decreases as the estimated retard correction amount STIGRTD increases as shown in FIG. 8B. The torque reduction coefficient KIGTRQDN takes a value greater than "0" and equal to or less than "1".

In step S79, the middle target intake air amount GAIROBJMID and the torque reduction coefficient KIGTRQDN are applied to the following equation (9), to calculate an estimated output torque TRQTMP. In the equation (9), KGATRQ is a conversion coefficient set to a predetermined value.

$$TRQTMP = GAIROBJMID \times KIGTRQDN \times KGATRQ \qquad (9)$$

In step S80, it is determined whether or not the estimated output torque TRQTMP is equal to the target torque TRQCGj. Normally, the answer to step S80 is initially negative (NO). Accordingly, the process proceeds to step S81, in which it is determined whether or not the index parameter i is equal to a predetermined maximum value IMAX (e.g., 15). The predetermined maximum value IMAX is a parameter depending on the bit number of a numerical value indicative of the estimated output torque TRQTMP and the target torque TRQCGj. If the bit number is "15", the predetermined maximum value IMAX is set to "15".

Since the answer to step S81 is initially negative (NO), the process proceeds to step S82, in which it is determined whether or not the estimated output torque TRQTMP is greater than the target torque TRQCGj. If the answer to step S82 is affirmative (YES), the upper target intake air amount GAIROBJHI is set to the middle target intake air amount GAIROBJMID (step S83). On the other hand, if TRQTMP is equal to or less than TRQCGj, the lower target intake air amount GAIROBJLO is set to the middle target intake air amount GAIROBJMID (step S84). Subsequently, the index parameter i is incremented by "1" and the process returns to step S75.

By repeating the calculation of steps S75 to S85, the estimated output torque TRQTMP converges to the target torque TRQCGj, for example, as shown in FIG. 8O. FIG. 8O shows an example that the convergence is attained in four times of calculation.

If the estimated output torque TRQTMP converges to the target torque TRQCGj and the answer to step S80 becomes affirmative (YES), or if the index parameter i reaches the maximum value IMAX, the process proceeds to step S86, in which the target intake air amount GAIROBJ is calculated by the following equation (10). By the equation (10), the target intake air amount GARIOBJ is calculated by limiting the middle target intake air amount GAIROBJMID so as not to exceed the maximum intake air amount GAIRMAX.

$$GAIROBJ = \min(GAIROBJMID, GAIRMAX) \qquad (10)$$

By retrieving a predetermined conversion table according to the target intake air amount GAIROBJ calculated by the process of FIG. 6, the target throttle valve opening THOBJ is calculated. The throttle valve is activated so that the detected throttle valve opening TH coincides with the target throttle valve opening THOBJ. This throttle valve opening control process is executed at the first predetermined time intervals T1.

It is to be noted that the second predetermined time interval T2, which is the execution period of the process of FIG. 6, is changed according to the calculation load condition of the CPU, and T2 is set so that the maximum time period (T2×IMAX) which is necessary for the calculation of the target intake air amount GAIROBJ, becomes shorter than the first predetermined time intervals T1. With such setting of T2, the calculation of the target intake air amount GAIROBJ can be completed in a time period shorter than the control period of the throttle valve opening when performing the above-described convergence calculation. Consequently, the control delay can be prevented.

As described above, in the process of FIG. 6, the target intake air amount GAIROBJ is calculated by the convergence calculation when the convergence calculation execution flag FCTL is equal to "1". That is, the estimated retard correction amount STIGRTD of the ignition timing is calculated using the middle target intake air amount GAIROBJMID which is a temporary target intake air amount; the estimated output torque TRQTMP is calculated taking the output torque reduction by the retard correction of the ignition timing into account; the middle target intake air amount GAIROBJMID is updated so that the estimated output torque TRQTMP converges to the target torque TRQCGj, and the target intake air amount GAIROBJ is set to the middle target intake air amount GAIROBJMID at the time the estimated output torque TRQTMP converges to the target torque TRQCGj.

FIGS. 9A to 9E are time charts for illustrating an effect of the convergence calculation. In FIGS. 9A to 9E show changes in the control parameters corresponding to the cylinders (which are operated even in the partial-cylinder operation) of the first bank when the cylinder-halting condition satisfied flag FCSTP changes from "1" to "0" at time t21. At time t21, the torque reduction coefficient KIGTRQDN (FIG. 9B) is calculated according to the estimated retard correction amount STIGRTD (FIG. 9O). Accordingly, the torque reduction coefficient KIGTRQDN immediately falls to a value according to the estimated retard correction amount STIGRTD.

Figure 9A:
FIGS. 9A-9E are time charts for illustrating the process of FIG. 6.
Figure 9B:
Figure 9C:
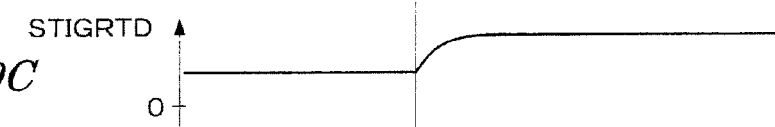
Figure 9D:

The solid line in FIG. 9D corresponds to the estimated intake pressure STPBGATQ, and the dashed line corresponds to the intake pressure PBA. The intake pressure PBA gradually falls to an intake pressure corresponding to the all-cylinder operation. In contrast, the estimated intake pressure STPBGATQ immediately falls to an intake pressure corresponding to the all-cylinder operation by the convergence calculation. The solid line in FIG. 9E corresponds to the target intake air amount GAIROBJ obtained by the convergence calculation, and the dashed line corresponds to the target intake air amount GAIROBJ obtained by the conventional method.

According to the conventional method, the target intake air amount GAIROBJ is calculated according to the target torque based on the present ignition timing. Therefore, as shown in the portion A of FIG. 9E, an undershoot of the target intake air amount GAIROBJ occurs, and thereafter, the target intake air amount GAIROBJ gradually converges to the value corresponding to the all-cylinder operation. On the other hand, in this embodiment, the ignition timing corresponding to the target intake air amount is estimated, and the convergence calculation is performed by using this estimated ignition timing, which makes it possible to prevent the undershoot from occurring. Consequently, the control response of the target intake air amount GAIROBJ is improved, so that the control response of the actual intake air amount is improved.

Figure 9E:
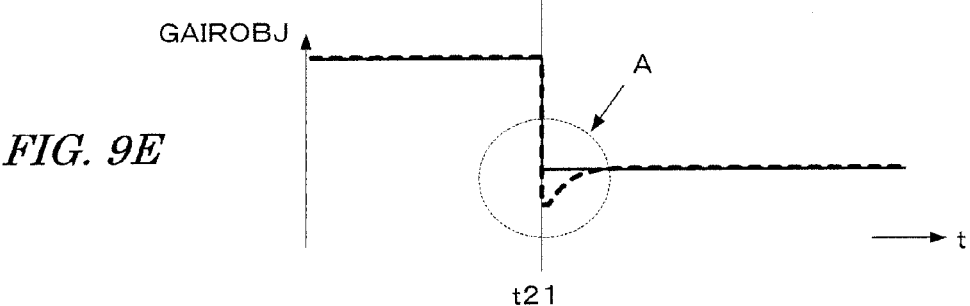

It is to be noted that the repetitive calculation of IMAX times at the maximum is completed at time t21 of FIG. 9 since the scale of the time axis of FIG. 9E is so large compared with the execution period of the above-described convergence calculation. Therefore, the target intake air amount GAIROBJ changes stepwise at time t21.

As described above, in this embodiment, when initially executing step S75 of FIG. 6, the middle target intake air amount GAIROBJMID which is the temporary target intake air amount is initialized. Subsequently, the convergence calculation, which includes step S76 of calculating the estimated intake pressure STPBGATQ corresponding to the intake pressure when supplying the middle target intake air amount GAIROBJMID to the engine 1, step S77 of calculating the estimated retard correction amount STIGRTD of the ignition timing in the estimated intake pressure STPBGATQ, steps S78 and S79 of calculating the estimated output torque TRQTMP according to the middle target intake air amount GAIROBJMID and the estimated retard correction amount STIGRTD, steps S82 to S84 and S75 of modifying the middle target intake air amount GAIROBJMID so that the estimated output torque TRQTMP approaches the target torque TRQCGj, are repeatedly performed. Subsequently, the middle target intake air amount GAIROBJMID at the convergence time when the estimated output torque TRQTMP coincides with the target torque TRQCGj is set as the target intake air amount GAIROBJ. By thus performing the convergence calculation, the intake air amount control is performed taking the setting of the retard correction amount of the ignition timing into account, which improves the response performance of the control for making the actual engine output torque coincide with the target output torque TRQOBJ. Therefore, the target intake air amount GAIROBJ is appropriately set to improve the control response performance especially when the target torque TRQCGj rapidly changes, as described above with reference to FIGS. 9A to 9E.

Further, the target intake air amount GAIROBJ is calculated with the convergence calculation corresponding to the change in the target torque TRQCGj upon switching between the all-cylinder operation and the partial cylinder operation. Consequently, the target intake air amount GAIROBJ can be appropriately set when changing the target torque TRQCGj upon switching of the operating cylinder number, which suppresses a change in the engine rotational speed NE upon the switching.

In this embodiment, the cylinder-halting mechanism 30 and the ECU 5 constitute the operating cylinder switching means; the throttle valves 3A and 3B, the actuators 4A and 4B, and the ECU 5 constitute the intake air amount control means; and the ECU 5 constitutes the target intake air amount calculating means and the ignition timing control means. Specifically, the process of FIGS. 6 and 7 correspond to the target intake air amount calculating means, and the process of FIG. 4 corresponds to the ignition timing control means.

Modification 1

Figure 10:
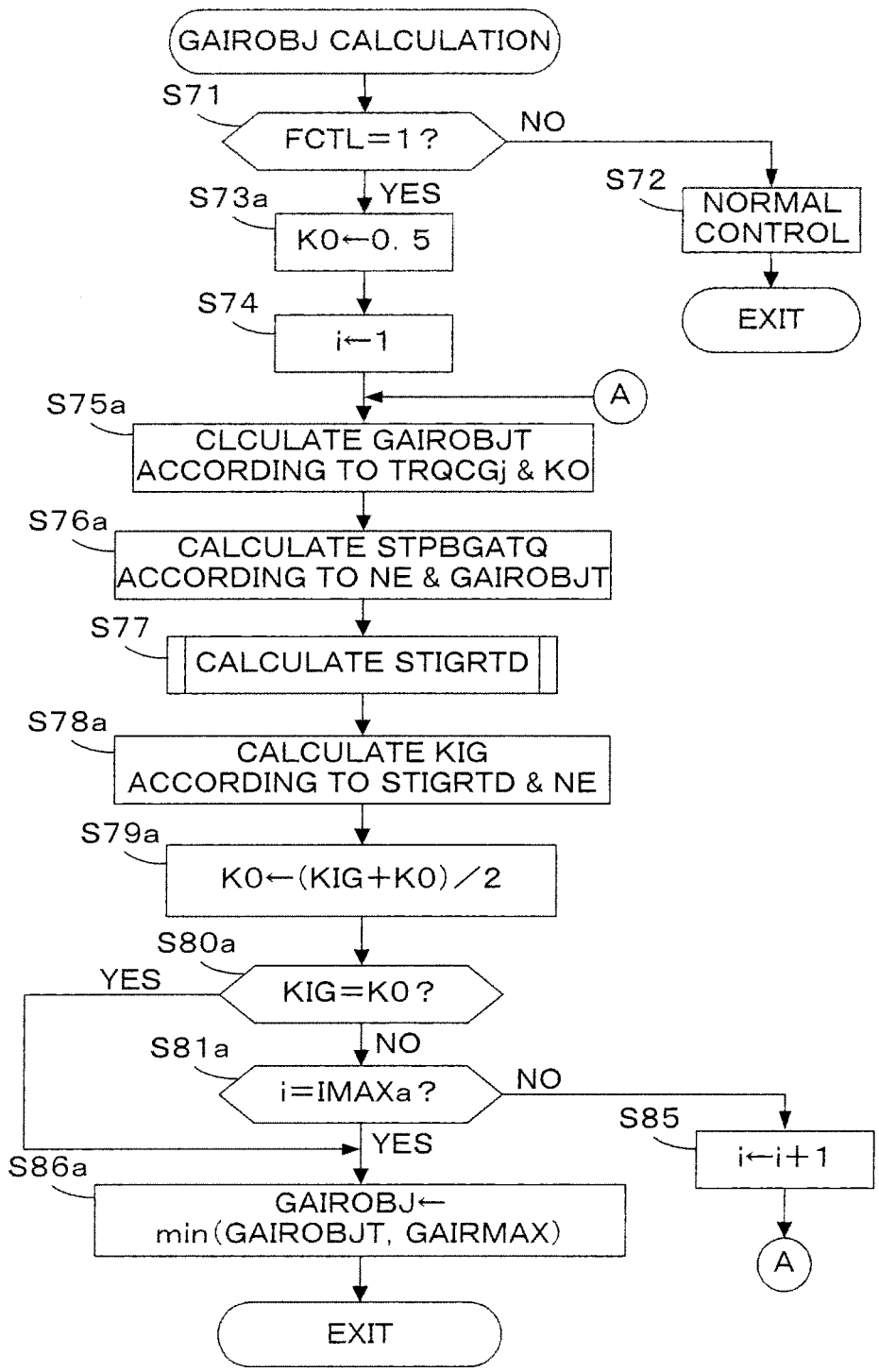
FIG. 10 is a flowchart of a modification of the process of FIG. 6.

In the embodiment described above, the target intake air amount GAIROBJ may be calculated by the process of FIG. 10 instead of the process of FIG. 6.

The process of FIG. 10 is obtained by deleting steps S82 to S84 in FIG. 6 and replacing steps S73, S75, S76, S78 to S81, and S86 respectively with steps S73a, S75a, S76a, S78a to S81a, and S86a.

Figure 11A:
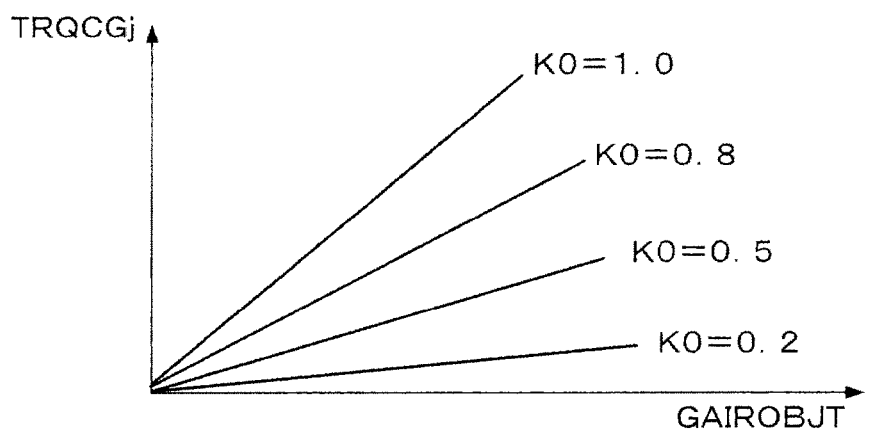
FIGS. 11A and 11B show tables referred to in the process of FIG. 10.

In step S73a, a temporary torque reduction coefficient K0 is set to "0.5". In step S76a, a GAIROBJT map shown in FIG. 11A is retrieved according to the target torque TRQCGj and the temporary torque reduction coefficient K0, to calculate a temporary target intake air amount GAIROBJT. The GAIROBJT map is set so that the rate of change in the target torque TRQCGj with respect to a change in the temporary target intake air amount GAIROBJT decreases as the temporary torque reduction coefficient K0 decreases. In other words, the GAIROBJT map is set so that the change rate of the temporary target intake air amount GARIOBJT with respect to a change in the target torque TRRQCGj increases as the temporary torque reduction coefficient K0 decrease.

Figure 11B:
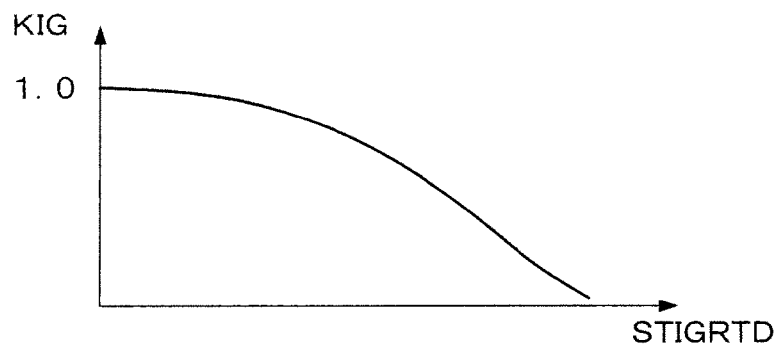

In step S76a, the STPBGATQ map is retrieved according to the engine rotational speed NE and the temporary target intake air amount GAIROBJT, to calculate the estimated intake pressure STPBGATQ. In step S78a, a KIG map is retrieved according to the estimated retard correction amount STIGRTD and the engine rotational speed NE, to calculate a torque reduction coefficient KIG indicative of the reduction rate of the engine output torque caused by the retard correction of the ignition timing. The KIG map is set, as shown in FIG. 11B, so that the torque reduction coefficient KIG decreases as the estimated retard correction amount STIGRTD increases. The torque reduction coefficient KIG takes a value greater than "0" and equal to or less than "1".

In step S79a, the temporary torque reduction coefficient K0 is updated by the following equation (11).

$$K0=(KIG+K0)/2 \quad (11)$$

In step S80a, it is determined whether or not the torque reduction coefficient KIG is equal to the temporary torque reduction coefficient K0. Normally, the answer to step S80a initially is negative (NO). Accordingly, it is determined whether or not the index parameter i is equal to the maximum value IMAXa (e.g., 8) (step S81a). Since the answer to step S81a is initially negative (NO), the index parameter i is incremented by "1" (step S85), and the process returns to step S75a.

The maximum value IMAXa is a parameter depending on the bit number of a numerical value indicative of the torque reduction coefficient KIG and the temporary torque reduction coefficient K0. If the bit number is "8", for example, the maximum value IMAXa is set to "8".

If the temporary torque reduction coefficient K0 and the torque reduction coefficient KIG become equal to each other and the answer to the step S80a is affirmative (YES), or if the index parameter i reaches the maximum value IMAXa, by repeating the calculation of steps S75a to S85, the process proceeds to step S86a, in which the target intake air amount GAIROBJ is calculated by the following equation (12). The target intake air amount GAIROBJ is calculated with the equation (12) limiting the temporary target intake air amount GAIROBJT less than or equal to the maximum intake air amount GAIRMAX.

$$GAIROBJ=\min(GAIROBJT,GAIRMAX) \quad (12)$$

FIGS. 12A to 12E are time charts for illustrating the process of FIG. 10. FIGS. 12A to 12E show an example in which the target torque TRQCGj decreases stepwise at time t31 (FIG. 12A)). FIG. 12B to FIG. 12E respectively show changes in the temporary target intake air amount GAIROBJT, the estimated intake pressure STPBGATQ, the estimated retard correction amount STIGRTD, and the temporary torque reduction coefficient K0. In this example, the temporary torque reduction coefficient K0 becomes a constant value with eight calculations, i.e., the temporary torque reduction coefficient K0 becomes equal to the torque reduction coefficient KIG, and the calculation of the target intake air amount GAIROBJ is completed.

According to this modification 1, the maximum number of the repetitive calculation until the target intake air amount GAIROBJ is obtained can be reduced compared with the process of FIG. 6.

Modification 2

Figure 13:
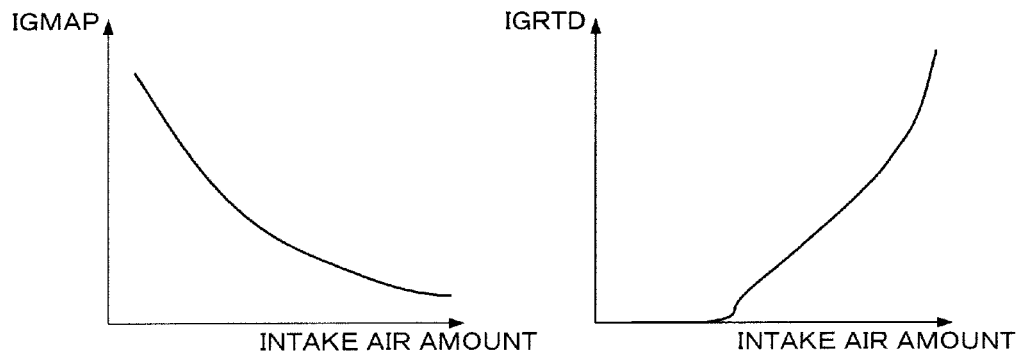
FIG. 13 shows maps for calculating an optimal ignition timing (IGMAP) and a retard correction amount (IGTRD)

The optimal ignition timing IGMAP and the retard correction amount IGRTD applied to the optimal ignition timing IGMAP may be calculated according to the intake air amount (they may be set according to the intake air amount e.g., as shown in FIG. 13). Therefore, the estimated retard correction amount STIGRTD may be directly calculated from the middle target intake air amount GAIROBJMID which is the temporary target intake air amount. That is, the estimated retard correction amount STIGRTD may be calculated by retrieving a map on which the estimated retard correction amounts STIGRTD are set according to the engine rotational speed NE and the middle target intake air amount GAIROBJMID.

Modification 3

Further, since the intake air amount depends on the engine operating conditions, such as the throttle valve opening and the engine rotational speed NE, the target throttle valve opening THOBJ may be used as a parameter corresponding to the target intake air amount. In this case, the estimated retard correction amount STIGRTD may be calculated based on a temporary target throttle valve opening THOBJT. That is, an initial value setting of the temporary target throttle valve opening THOBJT is firstly performed according to the target output torque TRQCGj, and thereafter the following steps a) to c) are repeatedly executed until the convergence time at which a difference DTRQ between the estimated output torque TRQTMP and the target output torque TRQCGj (=|TRQTMP−TRQCGj|) becomes equal to or less than a predetermined threshold value DTRQTH (e.g., 1 Nm), and the target throttle valve opening THOBJ may be set to the temporary throttle valve opening THOBJT at the convergence time:

a) calculating the estimated retard correction amount STIGRTD based on the temporary target throttle valve opening THOBJT;

b) calculating the estimated output torque TRQTMP according to the temporary target throttle valve opening THOBJT and the estimated retard correction amount STIGRTD; and c) modifying the temporary target throttle valve opening THOBJT so that the estimated output torque TRQTMP approaches the target output torque TRQCGj.

Other Modifications

Figure 14A:
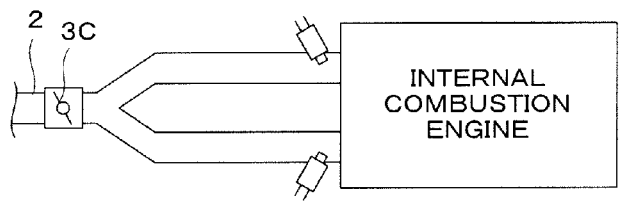
FIGS. 14A and 14B are diagrams for illustrating examples of other internal combustion engines to which the present invention is applicable.
Figure 14B:
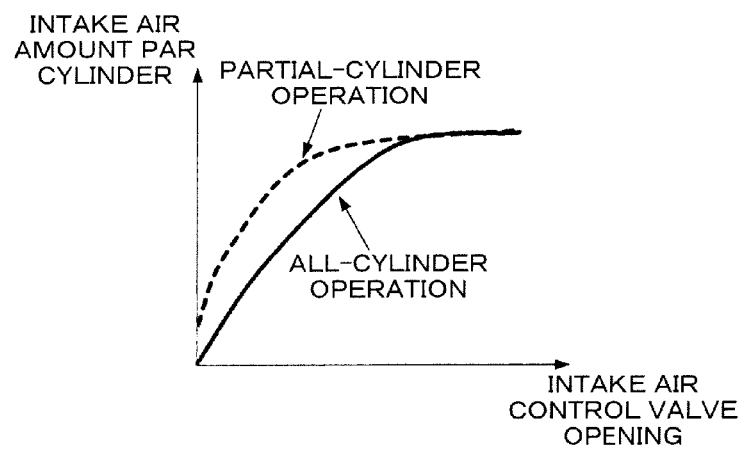

In the above-described embodiment, the configuration in which the first cylinder group (first bank) and the second cylinder group (second bank) are respectively provided with the intake air control valve (throttle valves 3A and 3B), is shown. The present invention is not limited to the above-described embodiment, and may be applied to a configuration in which a common intake air control valve (throttle valve 3C) is provided for the first cylinder group (first bank) and the second cylinder group (second bank) as shown in FIG. 14A. In the configuration employing the common intake air control valve, it is necessary to switch the relationships (maps) between the opening of the intake air control valve and the intake air amount according to which is performed, the all-cylinder operation (solid line) or the partial-cylinder operation (dashed line) as shown in FIG. 14B even if the target output torque is constant. The target intake air amount is calculated corresponding to the switching between the all-cylinder operation and the partial-cylinder operation, thereby suppressing changes in the engine rotational speed caused by the switching.

Further, in the above-described embodiment, the target air amount calculation process of FIG. 6 is executed and the target intake air amount GAIROBJ is calculated by the convergence calculation, upon switching between the all-cylinder operation and the partial-cylinder operation, in the idling condition, and immediately after the shift from the idling condition to the normal operating condition (i.e., when the convergence calculation execution flag FCTL is equal to "1"). Alternatively, the target intake air amount GAIROBJ may always be calculated by the convergence calculation. By always performing the convergence calculation, the control response performance of the control for making the engine output torque coincide with the target output torque can be improved even when the target output torque is largely changed due to an input of the auxiliary load or the accelerator operation.

Further, in the above-described process of FIG. 6, the time at which the estimated output torque TRQTMP coincides with the target torque TRQCGj is considered as the convergence time. Alternatively, the time at which the difference DTRQ between the estimated output torque TRQTMP and the target torque TRQCGj becomes equal to less than the predetermined threshold value DTRQTH may be considered as the convergence time, and the target intake air amount GAIROBJ may be set to the middle target intake air amount GAIROBJMID at the convergence time.

Further, in the process of FIG. 10, the time at which the temporary torque reduction coefficient K0 coincides with the torque reduction coefficient KIG is considered as the convergence time. Alternatively, the time at which a difference DK between the temporary torque reduction coefficient K0 and the torque reduction coefficient KIG (=|K0−KIG|) becomes equal to or less than a predetermined threshold value DKTH (e.g., 0.02) may considered as the convergence time, and the temporary target intake air amount GAIROBJT is set to the target intake air amount GAIROBJ at the convergence time.

Further, in the above-described embodiments, the example in which the present invention is applied to the control of the V-type 10-cylinder engine is shown. The present invention is applicable also to the control of the normal in-line cylinder engine having a single intake system.

The present invention can be applied also to a control system for a watercraft propulsion engine such as an outboard engine having a vertically extending crankshaft.

What is claimed is:

1. A control system for an internal combustion engine, comprising:

target intake air amount calculating means for calculating a target intake air amount according to a target output torque of said engine;

intake air amount control means for controlling an intake air amount of said engine according to the target intake air amount; and ignition timing control means for controlling an ignition timing of said engine;

wherein said target intake air amount calculating means repeatedly executes the following steps 1) to 3) until a convergence time at which a difference between an estimated output torque and the target output torque becomes equal to or less than a predetermined threshold value, after setting an initial value of a temporary target intake air amount, and sets the target intake air amount to the temporary target intake air amount at the convergence time:

1) calculating an estimated retard correction amount which is a retard correction amount of the ignition timing when supplying the temporary target intake air amount of air to said engine;

2) calculating the estimated output torque of said engine according to the temporary target intake air amount and the estimated retard correction amount; and
3) modifying the temporary target intake air amount so that the estimated output torque approaches the target output torque.

2. A control system according to claim 1, wherein a calculation period of said target intake air amount calculating means is set so that a maximum time period necessary for calculating the target intake air amount is shorter than a control period of said intake air amount control means.

3. A control system according to claim 1, wherein said engine has a plurality of cylinders which consist of a first cylinder group and a second cylinder group, and
said control system includes operating cylinder switching means for switching between an all-cylinder operation in which both of the first and second cylinder groups are operated and a partial-cylinder operation in which one of the first and second cylinder groups is operated,
wherein said target intake air amount calculating means calculates the target intake air amount upon the switching between the all-cylinder operation and the partial-cylinder operation.

4. A control system for an internal combustion engine, comprising:
target intake air amount calculating means for calculating a target intake air amount according to a target output torque of said engine;
intake air amount control means for controlling an intake air amount of said engine according to the target intake air amount; and
ignition timing control means for controlling an ignition timing of said engine;
wherein the target intake air amount calculating means repeatedly executes the following steps 1) to 4) until a convergence time at which a difference between a temporary torque reduction coefficient and an estimated torque reduction coefficient indicative of a reduction rate of the output torque of said engine becomes equal to or less than a predetermined threshold value, after setting an initial value of the temporary torque reduction coefficient, and sets the target intake air amount to a temporary target intake air amount at the convergence time:
1) calculating the temporary target intake air amount according to the temporary torque reduction coefficient and the target output torque;
2) calculating an estimated retard correction amount which is a retard correction amount of the ignition timing when supplying the temporary target intake air amount of air to said engine;
3) calculating the estimated torque reduction coefficient according to the estimated retard correction amount; and
4) modifying the temporary torque reduction coefficient so that the temporary torque reduction coefficient approaches the estimated torque reduction coefficient.

5. A control system according to claim 4, wherein a calculation period of said target intake air amount calculating means is set so that a maximum time period necessary for calculating the target intake air amount is shorter than a control period of said intake air amount control means.

6. A control system according to claim 4, wherein said engine has a plurality of cylinders which consist of a first cylinder group and a second cylinder group, and
said control system includes operating cylinder switching means for switching between an all-cylinder operation in which both of the first and second cylinder groups are operated and a partial-cylinder operation in which one of the first and second cylinder groups is operated,
wherein said target intake air amount calculating means calculates the target intake air amount upon the switching between the all-cylinder operation and the partial-cylinder operation.

7. A control method for an internal combustion engine, comprising the steps of:
a) calculating a target intake air amount according to a target output torque of said engine;
b) controlling an intake air amount of said engine according to the target intake air amount; and
c) controlling an ignition timing of said engine;
wherein the following steps 1) to 3) are repeatedly executed in said step a) until a convergence time at which a difference between an estimated output torque and the target output torque becomes equal to or less than a predetermined threshold value, after setting an initial value of a temporary target intake air amount, and the target intake air amount is set to the temporary target intake air amount at the convergence time:
1) calculating an estimated retard correction amount which is a retard correction amount of the ignition timing when supplying the temporary target intake air amount of air to said engine;
2) calculating the estimated output torque of said engine according to the temporary target intake air amount and the estimated retard correction amount; and
3) modifying the temporary target intake air amount so that the estimated output torque approaches the target output torque.

8. A control method according to claim 7, wherein a period of executing said step a) is set so that a maximum time period necessary for calculating the target intake air amount is shorter than a period of executing said step b).

9. A control method according to claim 7, wherein said engine has a plurality of cylinders which consist of a first cylinder group and a second cylinder group, and
said control method includes the step of d) switching between an all-cylinder operation in which both of the first and second cylinder groups are operated and a partial-cylinder operation in which one of the first and second cylinder groups is operated,
wherein the target intake air amount is calculated upon the switching between the all-cylinder operation and the partial-cylinder operation.

10. A control method for an internal combustion engine, comprising the steps of:
a) calculating a target intake air amount according to a target output torque of said engine;
b) controlling an intake air amount of said engine according to the target intake air amount; and
c) controlling an ignition timing of said engine;
wherein the following steps 1) to 4) are repeatedly executed in said step a) until a convergence time at which a difference between a temporary torque reduction coefficient and an estimated torque reduction coefficient indicative of a reduction rate of the output torque of said engine becomes equal to or less than a predetermined threshold value, after setting an initial value of the temporary torque reduction coefficient, and the target intake air amount is set to a temporary target intake air amount at the convergence time:
1) calculating the temporary target intake air amount according to the temporary torque reduction coefficient and the target output torque;

2) calculating an estimated retard correction amount which is a retard correction amount of the ignition timing when supplying the temporary target intake air amount of air to said engine;
3) calculating the estimated torque reduction coefficient according to the estimated retard correction amount; and
4) modifying the temporary torque reduction coefficient so that the temporary torque reduction coefficient approaches the estimated torque reduction coefficient.

11. A control method according to claim 10, wherein a period of executing said step a) is set so that a maximum time period necessary for calculating the target intake air amount is shorter than a period of executing said step b).

12. A control method according to claim 10, wherein said engine has a plurality of cylinders which consist of a first cylinder group and a second cylinder group, and said control method includes the step of d) switching between an all-cylinder operation in which both of the first and second cylinder groups are operated and a partial-cylinder operation in which one of the first and second cylinder groups is operated, wherein the target intake air amount is calculated upon the switching between the all-cylinder operation and the partial-cylinder operation.

* * * * *